(12) United States Patent
Kimura et al.

(10) Patent No.: US 6,512,061 B1
(45) Date of Patent: Jan. 28, 2003

(54) PROCESS FOR PRODUCING POLYPROPYLENE OR PROPYLENE RANDOM COPOLYMER

(75) Inventors: Masami Kimura, Chiba (JP); Takanori Nakashima, Chiba (JP); Chikashi Okayama, Chiba (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/889,223

(22) PCT Filed: Dec. 22, 1999

(86) PCT No.: PCT/JP99/07218
§ 371 (c)(1),
(2), (4) Date: Jul. 13, 2001

(87) PCT Pub. No.: WO00/42081
PCT Pub. Date: Jul. 20, 2000

(30) Foreign Application Priority Data

Jan. 13, 1999 (JP) .............................. 11-006034

(51) Int. Cl.$^7$ .............................. C08F 4/42; C08F 110/06
(52) U.S. Cl. .................. 526/128; 526/351; 526/107; 526/125.1; 526/901; 502/103; 502/104; 502/115; 502/116; 502/118
(58) Field of Search .................. 526/351, 107, 526/125.1, 128, 901; 502/103, 104, 115, 116, 118

(56) References Cited

U.S. PATENT DOCUMENTS

| | | | |
|---|---|---|---|
| 3,954,909 A | 5/1976 | Havas et al. | |
| 4,424,322 A | 1/1984 | Hattori et al. | |
| 4,952,649 A | 8/1990 | Kioka et al. | |
| 5,100,849 A | 3/1992 | Miya et al. | |
| 5,122,490 A | 6/1992 | Uwai et al. | |
| 5,539,067 A | 7/1996 | Parodi et al. | |
| 5,618,771 A | 4/1997 | Parodi et al. | |
| 5,965,478 A | 10/1999 | Goto et al. | |
| 6,194,342 B1 | 2/2001 | Parodi et al. | |

FOREIGN PATENT DOCUMENTS

| | | |
|---|---|---|
| EP | 0 053 997 A1 | 11/1981 |
| EP | 279153 | 8/1988 |

(List continued on next page.)

OTHER PUBLICATIONS

Testing Method for Melt Flow Rate of Thermoplastics, JIS K 7210, 1976, p. 529–543.

*Primary Examiner*—David W. Wu
*Assistant Examiner*—Ling-Siu Choi
(74) *Attorney, Agent, or Firm*—McDermott, Will & Emery

(57) ABSTRACT

The invention provides a process for producing polypropylene and/or random copolymers of propylene type using a stereoregular catalyst which comprises a titanium-containing solid catalyst component (A), an organoaluminum compound (B) and if required an organosilicon compound (C), wherein

[I] before carrying out homopolymerization of propylene or random copolymerization of propylene with an α-olefin other than propylene, the above component (A), an organoaluminum compound (B') and if required an organosilicon compound (C') are used, and a small amount of propylene or ethylene and/or an α-olefin of 4–20 carbon atoms for pre-activation treatment is supplied to the above component (A), and

[II] a catalyst which is prepared by adding an organosilicon compound (C") to the pre-activated stereoregular catalyst in a molar ratio of 0.1–50 as Si/Ti, is used to produce polypropylene or propylene random copolymers.

2 Claims, 2 Drawing Sheets

FOREIGN PATENT DOCUMENTS

| | | |
|---|---|---|
| EP | 321218 | 6/1989 |
| GB | 1 490 414 | 2/1975 |
| GB | 2 051 094 A | 5/1980 |
| JP | 54-139986 | 10/1979 |
| JP | 58-138712 | 8/1983 |
| JP | 62-104810 | 5/1987 |
| JP | 62-104811 | 5/1987 |
| JP | 62-104812 | 5/1987 |
| JP | 64-10532 | 2/1989 |
| JP | 02-229805 | 9/1990 |
| JP | 09 48813 A * | 2/1997 |
| JP | 09-048813 | 2/1997 |
| JP | 9-278807 | 10/1997 |
| WO | WO 85/05111 | 11/1985 |

* cited by examiner

PROCESS FOR PRODUCING POLYPROPYLENE OR PROPYLENE RANDOM COPOLYMER

TECHNICAL FIELD

The present invention relates to a process for producing propylene homopolymers or propylene-α-olefin random copolymers using a highly active and highly stereoregular catalyst component.

BACKGROUND ART

In producing propylene homopolymers or propylene-α-olefin random copolymers, high activity catalysts have industrially very high utility value because the residual catalyst is not necessary to remove from the polymer produced by polymerization, which allows simple after-treatment process of the polymer.

A gas-phase polymerization method is one of the processes of production effectively utilizing the characteristic of high activity catalysts. In applying the high activity catalysts to the gas-phase polymerization, however, lump and string-like irregular shape polymer is formed when the heat of polymerization is removed insufficiently. As a remedy to prevent the formation of lump and string-like irregular shape polymer, Japanese Examined Patent Publication No. (hereinafter referred to as JP-B 52-45749/1977, JP-B 60-26407/1985, JP-B 61-9964/1986, JP-B 64-10532/1989, National Stage of International Application No. (PCT JP-A) 61-502061/1986, and Japanese Unexamined Patent Publication No. (hereinafter referred to as JP-A 5-117317/1993 disclose processes for polymerization of olefins using said catalysts after preliminary polymerization of ethylene and/or α-olefin. JP-A 50-119885/1975 discloses a method for eliminating particle-size distribution and preventing irregular growth of particles and aggregation of a large number of small particles which form a polymer lump, by altering the quantity of transient metal component in the supported catalyst. Further, JP-A 54-139986/1979 discloses a method for eliminating of blockage in a catalyst-supplying tube to prevent formation of a polymer lump by supplying a suspension of preliminary polymerized catalyst from the inner tube of a double tube nozzle and liquefied propylene from the outer tube. Moreover, JP-A 9-278807/1997 discloses a method for preventing formation of a polymer lump by irradiating β-ray to the inside of the polymerization vessel. These methods, however, necessitate using an expensive apparatus of no practical use, or are insufficient in preventing formation of irregular shape polymer such as lump. The lump is formed in large quantity in a range of high comonomer concentration, and there is no sufficient remedy for preventing formation of polymer lumps.

The present inventors, in producing propylene homopolymers or propylene-α-olefin random copolymers using a high activity catalysts, worked assiduously to elucidate an alternative process in which formation of the polymer lumps is least. As a result, we found that polymers with the least amount of polymer lump could be obtained by carrying out the polymerization reaction with addition of an organosilicon compound after pre-activation treatment of a supported Ziegler-type catalyst. The present invention was completed based on this finding.

The object of the invention is to provide the above-mentioned process for producing propylene homopolymers or propylene-α-olefin random copolymers using a supported Ziegler-type catalyst, wherein formation of irregular shape polymer such as polymer lump decreases and a long-term and stable operation is allowed.

DISCLOSURE OF THE INVENTION

The invention is composed of the following items (1)–(2).

(1) A process for producing propylene homopolymers or propylene-α-olefin random copolymers which comprises:

in a process for producing propylene homopolymers or propylene-α-olefin random copolymers using a stereoregular catalyst which comprises a titanium-containing solid catalyst component (A) an organoaluminum compound (B) of the general formula $AlR^1 mX_{3-m}$ (wherein $R^1$ is a hydrocarbon group of 1–20 carbon; X is a halogen; m is an integer of $3 \geq m > 5$), and if required an organosilicon compound (C) of the general formula $R^2_x R^3_y Si(OR^4)_z$ (wherein $R^2$ and $R^4$ each is a hydrocarbon group; $R^3$ is a hydrocarbon group or a hydrocarbon group containing a heteroatom or atoms; $0 \leq X \leq 2$, $1 \leq Y \leq 3$, $1 \leq Z \leq 3$, and X+Y+Z=4),

[I] before carrying out homopolymerization of propylene or copolymerization of propylene with an α-olefin other than propylene, using the titanium-containing solid catalyst component (A), an organoaluminum compound (B') of the general formula $AlR^5 mX_{3-m}$ (wherein $R^5$ is a hydrocarbon group of 1–20 carbon atoms; X is a halogen atom; m is an integer of $3 \geq m > 1.5$), and if required an organosilicon compound (C') of the general formula $R^6_x R^7_y Si (OR^8)_z$ (wherein $R^6$ and $R^7$ each is a hydrocarbon group; $R^8$ is a hydrocarbon group or a hydrocarbon group containing a heteroatom or atoms; $0 \leq X \leq 2$, $1 \leq Y \leq 3$, $1 \leq Z \leq 3$, and X+Y+Z=4),

[II] treating the titanium-containing solid catalyst component (A) for pre-activation with propylene or ethylene and/or α-olefin of 4–20 carbon atoms, and

[III] using the catalyst which is prepared by adding an organosilicon compound (C") to the pre-activated stereoregular catalyst in a molar ratio of 0.1–50 as Si/Ti.

(2) A process as described in the above item 1, wherein the process for producing propylene homopolymers or propylene-α-olefin random copolymers is of a gas-phase polymerization.

Figure 1:
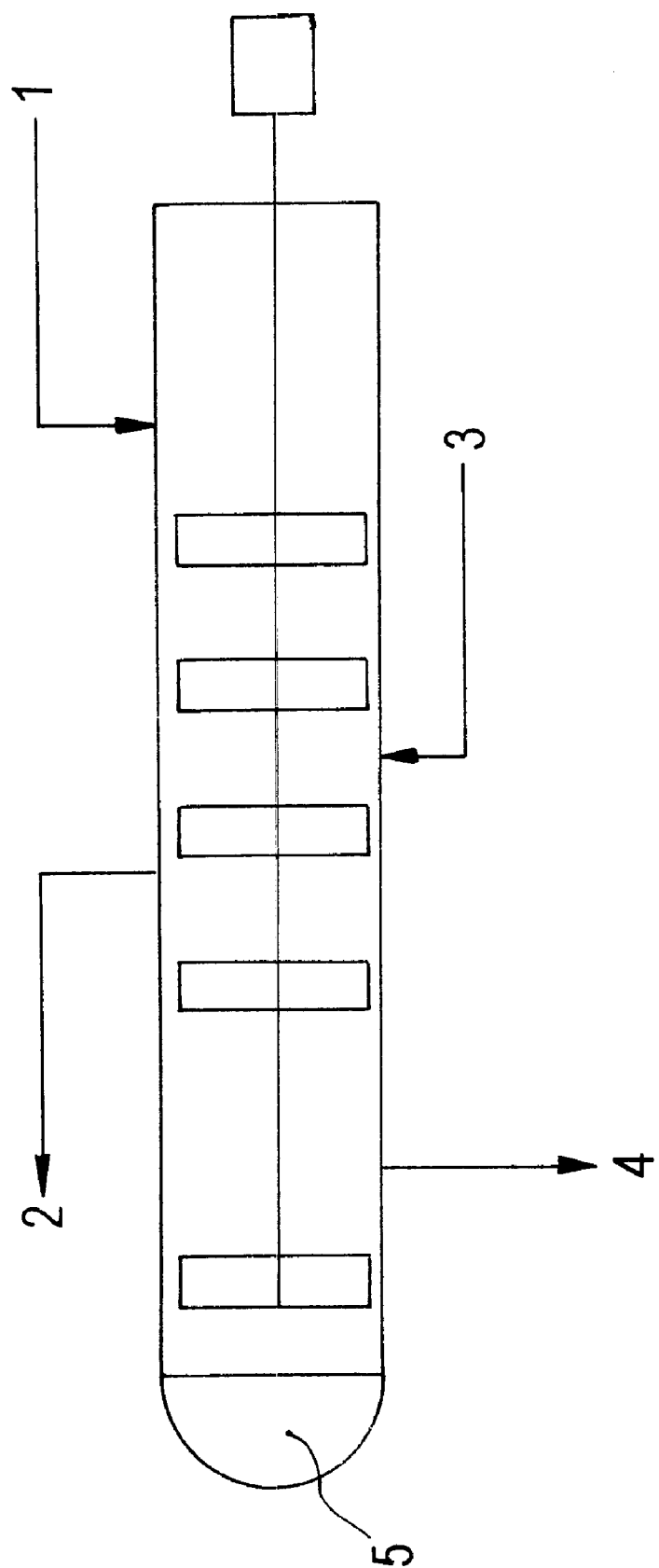
FIG. 1 is a flow chart showing the polymerization process of the invention.
Figure 2:
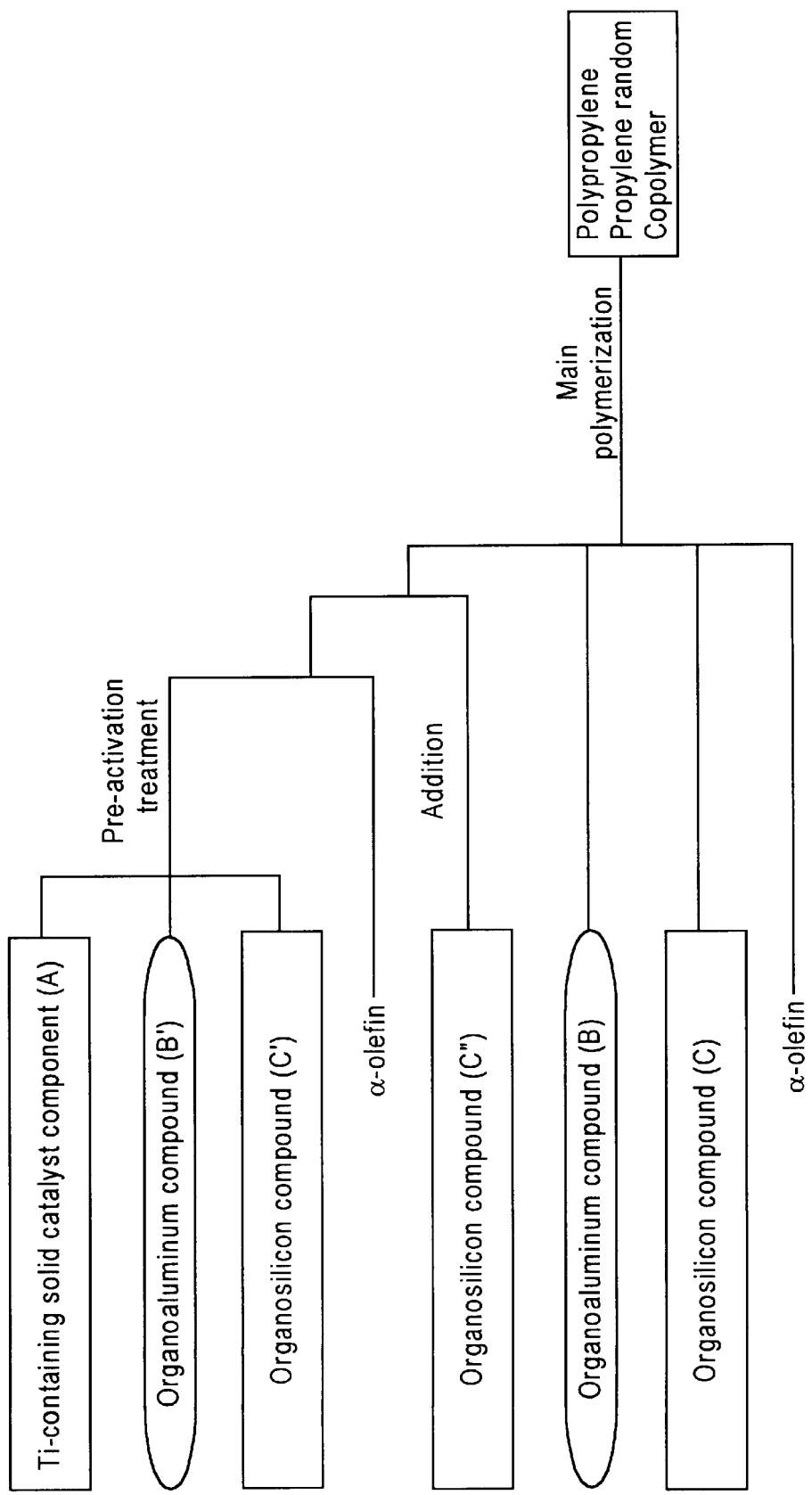
FIG. 2 is a flow chart showing a process for producing propylene homopolymers or propylene-α-olefin random copolymers of the invention.

The numbers used in FIG. 1 have the following meanings. 1: Inlet for supplying the starting materials; 2: Outlet for discharging unreacted gas; 3: Inlet for supplying hydrogen gas; 4: Outlet for taking out the polymer; 5: Polymerization vessel.

BEST MODE FOR CARRYING OUT THE INVENTION

The followings are practical description of the invention.

The pre-activation in the invention means that before the main polymerization, a titanium-containing solid component (A) is activated by preliminary polymerizing a small quantity of a-olefin with an organoaluminum compound (B') if required in combination with an organosilicon compound (C').

The titanium-containing solid catalyst component (A) includes inorganic carriers such as magnesium compounds, silica compounds, alumina, etc., or organic carriers such as polystyrene, etc., on which a titanium compound is supported, or to which carriers an electron-donating compound such as ethers or esters is allowed to react. Any of these known compounds may be used.

For example, the following solid catalyst components are exemplified: a supported titanium-containing catalyst component in which titanium chloride is supported on a magnesium compound and which contains titanium, magnesium, halogen, and an electron donor as essential components (see JP-A 8-283329/1996, JP-A 62-104810/1987, JP-A 62-104811/1987, JP-A 62-104812/1987, JP-A 57-63310/1982, JP-A 57-63311/1982, JP-A 58-83006/1983, JP-A 58-138712/1983); titanium-containing solid catalyst component which is prepared by spray-granulating an alcohol solution of magnesium compound, partially drying said solid catalyst component, and then treating the dried solid catalyst component with a titanium halide and an electron-donating compound (see JP-A 3-119003/1991); titanium-containing solid catalyst component which is prepared by fusing a magnesium compound into tetrahydrofuran/alcohol/electron donor, precipitating with titanium tetrachloride alone or in combination with an electron donor, and treating the resulting magnesium carrier with a titanium halide and an electron donating compound (see JP-A 4-103604/1992).

As organoaluminum compounds used in the pre-activation in the invention, those (B') of the general formula $AlR^5mX_{3-m}$ (wherein $R^5$ is a hydrocarbon group of 1–20 carbon atoms; X is a halogen atom; m is an integer of $3 \geq m > 1.5$) can be used.

Practical examples include trimethylaluminum, triethylaluminum, tri-n-propylaluminum, tri-n-butylaluminum, tri-i-butylaluminum, dimethylaluminum chloride, diethylaluminum chloride, methylaluminum sesquichloride, di-n-propylaluminum monochloride, ethylaluminum sesquichloride, ethylaluminum dichloride, diethylaluminum iodide, ethoxydiethylaluminum, and the like, and preferred organoaluminum compounds include tri-i-butylaluminum, triethylaluminum, and tri-n-butylaluminum. Most preferred is triethylaluminum.

These organoaluminum compounds may be used alone or as a mixture of two or more.

As organosilicon compounds (C'), if required, used in the pre-activation treatment in the invention, those of the general formula $R^6{}_xR^7{}_ySi(OR^8)$, (wherein $R^6$ and $R^7$ each is a hydrocarbon group; $R^8$ is a hydrocarbon group or a hydrocarbon group containing a heteroatom or atoms; $0 \leq X \leq 2$, $1 \leq Y \leq 3$, $1 \leq Z \leq 3$, and $X+Y+Z=4$) are used.

As practical examples, methyltrimethoxysilane, ethyltrimethoxysilane, n-propyltrimethoxysilane, phenylmethyldimethoxysilane, t-butyltrimethoxysilane, t-butyltriethoxysilane, phenyltriethoxysilane, methylethyldimethoxy-silane, methylphenyldimethoxysilane, dimethyldimethoxy-silane, dimethyldiethoxysilane, diisopropyldimethoxysilane, diisobutyldimethoxysilane, di-t-butyldimethoxysilane, diphenyldimethoxysilane, trimethylmethoxysilane, cyclohexylmethyldimethoxysilane, trimethylethoxysilane, and the like, and preferably, diisobutyldimethoxysilane, diisopropyldimethoxysilane, di-t-butyldimethoxysilane, cyclohexylmethyldimethoxysilane, and diphenyldimethoxysilane are used.

These organosilicon compounds may be used alone or as a mixture of two or more.

Though the amount of the organoaluminum compounds (B') to be used in the pre-activation treatment of the titanium-containing solid catalyst component (A) is not limited in particular, it may usually be used in an amount of 0.1–10 moles, preferably 0.3–5 moles, for 1 mole of the titanium atom in the the titanium-containing solid catalyst component (A).

When the amount of the organoaluminum compounds (B') to be used is less than 0.1 mole for 1 mole of the titanium atom in the titanium-containing solid catalyst component (A), the polymerization activity is so low in the pre-activation treatment that the time required for pre-activation is impractically prolonged.

When the amount to be used is more than 10 moles in the pre-activation treatment, or the content of the organoaluminum compound in the catalyst (catalyst at the stage before conducting the main polymerization) for the main polymerization is over 10 moles for 1 mole of the titanium atom, it is inappropriate to cause the formation of polymer lump during the main polymerization.

Alternatively, an organosilicon compound (C') may be used in a range of 0.01–10 moles, preferably 0.05–5 moles, for 1 mole of the organoaluminum compound.

The α-olefin used in pre-activation treatment of the titanium-containing solid catalyst component (A) includes ethylene, propylene, 1-butene, 1-pentene, 1-hexene, 1-octene, 1-decene, 1-dodecene, 1-tetradecene, 1-hexadecene, 1-octadecene, 1-eicosene, 4-methyl-1-pentene, 3-methyl-1-pentene, and the like. These α-olefins may be used alone or as a mixture of two or more. In the preliminary polymerization, a molecular-weight-regulating agent such as hydrogen may be used together in order to regulate the molecular weight of polymer.

The inert solvent used in pre-activation treatment of the titanium-containing solid catalyst component (A) includes those which do not affect strikingly the polymerization reaction, such as liquid saturated hydrocarbons, e.g., hexane, heptane, octane, decane, dodecane, liquid paraffin, etc., or silicone oil having a dimethylpolysiloxane structure, and the like. These inert solvents may be used alone or as a mixture of two or more.

In using these inert solvents, it is appropriate to eliminate impurities such as moisture, sulfur compounds, etc., which have an adverse effect on polymerization.

The pre-activation treatment of the invention is carried out at a temperature selected from the range of −30 to 100° C., preferably 10 to 80° C. The temperature for treatment may be fixed or changed within a range of the above-mentioned temperature.

The activity of the preliminary polymerization is low at a temperature lower than −30° C., which impractically prolongs the time required for pre-activation treatment of the titanium-containing solid catalyst component (A). In addition, the catalyst is denatured at temperatures over 100° C. to impractically decrease the polymerization activity.

The time required for pre-activation in the invention, though it is not limited in particular, may be usually selected from 10 minutes to 48 hours. The regulation of the temperature for pre-activation is difficult within a period less than 10 minutes, and the time longer than 48 hours is not practical.

The content of the titanium-containing solid catalyst component (A) in the inert solvent in the pre-activation treatment of the invention is usually in a range of 0.5–30 wt %, preferably 1–20 wt %, so as to permit the pre-activation under stirring, though it is not limited in particular. At less than 0.5 wt %, however, there is no problem in the slurry polymerization, while in the gas-phase polymerization an inert solvent is much brought into the polymerization medium to possibly have an adverse effect on polymer quality. At the content over 30 wt %, it becomes difficult to remove the heat generated during the pre-activation treatment.

The polymerization pressure during the pre-activation treatment may be in a range of an atmospheric pressure to 1 MPaG, preferably, 0.04–0.4 MPaG, though it is not limited in particular.

In the invention, the yield of α-olefin polymers in the pre-activation treatment of the titanium-containing solid catalyst component (A) is fixed in a range of 0.1–100 g, preferably 0.5–50 g for 1 g of the component (A). The yield of less than 0.1 g causes destruction of the catalyst in the main polymerization to easily produce fine powder. The yield over 100 g is not practical.

The α-olefin used in the pre-activation treatment of the invention may be added in any way, which may be selected from the following methods, that is, a constant feeding method in which the material is added at a constant rate, and a constant pressure feeding method in which the gas phase is kept at constant pressure in the reaction vessel, during the reaction. The both methods may be used in combination. The pre-activation treatment of the invention is preferably carried out with stirring in order to prevent occurrence of localized reaction. After completion of the reaction, the α-olefin remaining unchanged is removed to give a pre-activated catalyst.

The stereoregular catalyst composed of the above-mentioned titanium-containing solid catalyst component (A), organoaluminum compound (B') and organosilicon compound (C') is added to the catalyst pre-activated with α-olefin, to which is then added the organosilicon compound (C"), and the mixture is stirred. The organosilicon compound (C") may be the same as or different from the organosilicon compound (C') if required used in the pre-activation treatment. Such a compound includes, preferably, diisobutyldimethoxysilane, diisopropyldimethoxysilane, di-t-butyldimethoxysilane, cyclohexylmethyldimethoxysilane, and diphenyldimethoxysilane.

The organosilicon compound (C") is added to the catalyst pre-activated with α-olefin in a range of 0.1–50 moles, preferably 1–30 moles, for 1 mole of titanium atom in the titanium-containing solid catalyst component (A). The effect of the invention cannot be detected in less than 0.1 mole, and when more than 50 moles are added, the activity of the catalyst markedly decreases in the main polymerization.

After addition of the organosilicon compound (C") to the catalyst pre-activated with α-olefin, the stirring temperature is kept in a range of −30 to 100° C., preferably 10 to 80° C., which is within the temperature range in the pre-activation treatment.

The stirring is conducted under atmospheric pressure, over which pressure no effect is recognized.

After addition of the organosilicon compound (C") to the catalyst pre-activated with α-olefin, the stirring is preferably continued for a period of 10 minutes or longer, though it is not limited in particular. When the stirring time is less than 10 minutes, the effect of addition of the organosilicon compound (C") is insufficient.

The titanium-containing solid catalyst component (A) of the invention is used as a catalyst of 10–300 micron in average particle size.

The organoaluminum compound (B) used in the main polymerization of the invention may be the same as or different from the organoaluminum compound (B') used in the pre-activation treatment. Triethylaluminum is preferably used.

The organosilicon compound (C) if required used in the main polymerization of the invention may be the same as or different from the organosilicon compound (C') if required used in the pre-activation treatment. Preferably, diisobutyldimethoxysilane, diisopropyldimethoxysilane, di-t-butyldimethoxysilane, cyclohexylmethyldimethoxysilane, and diphenyldimethoxysilane are included.

The polyolefins produced in the invention include homopolymers of propylene and copolymers of propylene and α-olefin other than propylene.

The ratio of the organoaluminum compound (B) to the titanium-containing solid catalyst component (A) to be used in the main polymerization is Al/Ti=1–500 (atomic ratio), preferably 10–300 (atomic ratio), based on 1 gram atom of titanium substantially contained in the titanium-containing solid catalyst component.

The ratio of the organosilicon compound (C) if required used to the organoaluminum compound (B) to be used is Al/Si=0.5–20 (molar ratio), preferably 0.5–15 (molar ratio) When the Al/Si molar ratio is very high, the extraction rate of the resulting propylene homopolymer or propylene-α-olefin random copolymer with hexane or pentane becomes very high. The use of an excess amount of the organosilicon compound (C) markedly decreases the catalytic activity, and it is not practical.

The α-olefin used in the main polymerization of the invention may be the same as or different from that used in the pre-activation treatment, including ethylene, propylene, 1-butene, 1-pentene, 1-hexene, 1-octene, 1-decene, 1-dodecene, 1-tetradecene, 1-hexadecene, 1-octadecene, 1-eicosene, 4-methyl-1-pentene, 3-methyl-l-pentene, and the like. These α-olefin may be used alone or as a mixture of two or more. Additionally, in the main polymerization, a molecular weight-regulating agent such as hydrogen may be used together in order to regulate the molecular weight of polymer.

The melting point of the propylene-α-olefin random copolymer produced in the invention is preferably 100° C. or higher, more preferably 110° C. or higher. When the melting point is lower than 100° C., the resulting copolymer is poor in fluidity as powder, of which delivery is difficult. Poor fluidity as powder in polymerization greatly disturbs stable operation and is not preferred.

In the main polymerization, a known polymerization method, such as slurry polymerization method, gas-phase polymerization method, bulk polymerization method, and their combined method,maybe employed. Particularly,the gas-phase polymerization method affords a remarkable effect on the invention.

The temperature of the main polymerization, though it depends on the type of polymerization, may practically be selected from temperatures of the melting point or lower of the produced polymer. Usually, it is 20–160° C., preferably 40–100° C. The polymerization pressure may be in a range of an atmospheric pressure to 10 MPaG, preferably, 0.4–5 MPaG. The time for polymerization is selected usually from 10 minutes to 100 hours, preferably from 10 minutes to 10 hours, though it is not limited in particular. The polymerization may be achieved by any of batch operation, semi-continuous or continuous operation, and industrially a continuously operating polymerization is preferred. It is also possible to carry out the polymerization by means of multi-stage polymerization, wherein 1 or more of polymerization vessels of different polymerization condition are connected in series. In order to regulate the molecular weight of polymer, it is effective to add a molecular weight-regulating agent such as hydrogen to the polymerization medium.

EXAMPLES

The invention will be explained definitely by way of the following examples, which are not intended to limit the scope of the invention.

Example 1
a) Preparation of Titanium-containing Solid Catalyst Component (A)

In a nitrogen-replaced 5000 ml-volume stainless steel reaction vessel equipped with a stirrer was placed 300 ml of titanium tetrachloride and 200 ml of toluene to give a mixture. Then, a suspension prepared from 100 g of diethoxymagnesium (32 μm in average particle size), 500 ml of toluene, and 36 ml of di-n-butyl phthalate was added to the above mixture kept at 10° C. The temperature was then raised from 10° C. to 90° C. over 80 minutes, and the reaction mixture was stirred for 2 hours. After the reaction completion, the resulting solid product was washed 4 times with 1000 ml of toluene at 90° C., and additional 300 ml of titanium tetrachloride and 700 ml of toluene were added. The mixture was heated up to 112° C. and allowed to react with stirring for 2 hours. After the reaction completion, the mixture was washed 10 times with 1000 ml of n-heptane at 40° C. to give a solid catalyst component. The resulting titanium-containing solid catalyst component had 32 μm in average particle size, and the following analytical values: Mg: 18.6 wt %; Ti: 2.5 wt %; Cl: 61.3 wt %.

b) Preparation of a Pre-activated Catalyst (b-1)

Air in a 20 liter stainless steel reaction vessel equipped with stirring sloped blades was replaced with nitrogen gas. n-Hexane (18 liter) was placed therein, to which was added 75 g of the above-prepared solid catalyst component, 8.9 g of triethylaluminum (organoaluminum compound (B')) and 2.1 g of diisopropyldimethoxysilane (organosilicon compound (C')) Then, 150 g of propylene was supplied thereto over 3 hours. After the reaction completion, propylene remaining unchanged was eliminated and the pre-activated catalyst (b-1) was obtained, in which product 1 g of the titanium-containing solid catalyst component had reacted with 1.9 g of propylene.

c) Addition of an Organosilicon Compound (C") To the above-mentioned pre-activated catalyst (b-1) was added 34.9 g of organosilicon compound, diisopropyl-dimethoxysilane (C"), and the mixture was stirred for 30 minutes to give a catalyst for the main polymerization.

d) Polymerization step

According to the flow chart as shown in FIG. 1, air inside a horizontal-type polymerization vessel (L/D=6, inside volume, 100 liter) was replaced enough with nitrogen gas. In advance, hydrogen, ethylene, propylene and 1-butene were adjusted with stirring in the presence of a polypropylene powder bed so as to be the fixed molar ratio as shown in Table 1.

Through the upper stream of the polymerization vessel, the catalyst prepared for the main polymerization by adding w the organosilicon compound to the pre-activated catalyst was continuously supplied, while the amount of the titanium-containing solid catalyst component (A) was kept at 0.34 g/hr, the molar ratio of TEA (triethylaluminum) (organoaluminum compound (B)) to diisopropyldimethoxysilane (organosilicon compound (C)) was adjusted to 1.5 as Al/Si, and the ratio of Al/Mg was adjusted to 6 during the main polymerization. A gaseous mixture of propylene/ethylene/1-butene was continuously supplied to the polymerization vessel in such a condition that the reaction temperature was kept at 65"C., the reaction pressure at 2.0 MPaG, and the stirring rate at 40 rpm. Thus, gas-phase polymerization was continued for 50 hours. The reaction heat was removed as vaporization heat of the starting propylene supplied from a pipe 1. The unchanged gas discharged from the polymerization vessel was passed through a circulating pipe 2 and cooled and condensed outside the polymerization vessel, and returned to a vessel 5 for the main polymerization.

Moreover, in order to adjust the molecular weight, hydrogen gas was supplied continuously through a pipe 3 to control the molecular weight of the produced polymer by the hydrogen concentration of the gas phase in the reaction vessel In this situation, the rate of the polymer production was 12 kg/hr to 14 kg/hr. The gas phase had the molar ratio of ethylene/propylene=0.011, that of 1-butene/propylene=0.053, and that of hydrogen/propylene=0.041. Table 1 shows the polymerization condition.

TABLE 1

Polymerization Condition and Result of Polymerization - I

|  |  | Examp. 1 | Examp.2 | C. Ex. 1 | C. Ex. 2 | Examp. 3 | C. Ex. 3 | C. Ex. 4 | C. Ex. 5 |
|---|---|---|---|---|---|---|---|---|---|
| <Pre-Activation> |  |  |  |  |  |  |  |  |  |
| Organo-Al Compound (B') |  | TEA | TEA | TEA | TEA | TEA | TEA | TEA | TEA |
| Organo-Si Compound (C') |  | DiPDMS | DiPDMS | DiPDMS | DiPDMS | DiPDMS | DiPDMS | DiPDMS | DiPDMS |
| Pre-active Cat. Slurry Conc. | wt % | 0.631 | 0.631 | 0.631 | 0.631 | 0.842 | 0.842 | 0.842 | 0.842 |
| Al/Ti/Si mole ratio, pre-active |  | 2/1/0.3 | 2/1/0.3 | 2/1/0.3 | 2/1/0.3 | 2/1/0.3 | 2/1/0.3 | 2/1/0.3 | 2/1/0.3 |
| <Amt. of Org. Si Compd. Added> |  |  |  |  |  |  |  |  |  |
| Organo-Si Compound (C') |  | DiPDMS | DiPDMS | none | DiPDMS | DiPDMS | none | none | none |
| (C") conc. | mmol/L-C6 | 11 | 33 | — | 120 | 55 | — | — | — |
| Si (C")/Ti mole ratio |  | 5.1 | 15.2 | — | 55.2 | 19.0 | — | — | — |
| <Amt. of Org. Al Compd. Added> |  |  |  |  |  |  |  |  |  |
| Organo-Al Compound |  | none | None | none | none | none | none | none | none |
| Al/Ti mol. ratio, Org. Al Cmp. Add. |  | — | — | — | — | — | — | — | — |

TABLE 1-continued

Polymerization Condition and Result of Polymerization - I

|  |  | Examp. 1 | Examp. 2 | C. Ex. 1 | C. Ex. 2 | Examp. 3 | C. Ex. 3 | C. Ex. 4 | C. Ex. 5 |
|---|---|---|---|---|---|---|---|---|---|
| <Main Polymerization> | | | | | | | | | |
| Organo Al Compound (B) | | TEA | TEA | TEA | TEA | TEA | TEA | TEA | TEA |
| Organo Si Compound (C) | | DiPDMS | DiPDMS | DiPDMS | DiPDMS | DiPDMS | DiPDMS | DiPDMS | DiPDMS |
| Al (B)/Mg mole ratio | | 6 | 6 | 6 | 6 | 6 | 6 | 6 | 6 |
| Al (B)/Si (C) mole ratio | | 1.5 | 1.5 | 1.5 | 1.5 | 1.5 | 1.5 | 1.2 | 0.5 |
| Temperature | ° C. | 65 | 65 | 65 | 65 | 65 | 65 | 65 | 65 |
| Pressure | MPaG | 2.0 | 2.0 | 2.0 | 2.0 | 2.0 | 2.0 | 2.0 | 2.0 |
| H2/C3" mole ratio | | 0.040 | 0.042 | 0.038 | 0.048 | 0.030 | 0.026 | 0.027 | 0.034 |
| C2"/C3" mole ratio | | 0.011 | 0.012 | 0.010 | 0.015 | 0.021 | 0.018 | 0.018 | 0.023 |
| C4"/C3" mole ratio | | 0.053 | 0.054 | 0.052 | 0.056 | 0.083 | 0.081 | 0.081 | 0.085 |
| <Result> | | | | | | | | | |
| Ethylene content In copolymer | wt % | 2.0 | 2.1 | 2.0 | 2.0 | 3.6 | 3.6 | 3.5 | 3.6 |
| Butene content in copolymer | wt % | 4.0 | 4.0 | 4.0 | 4.1 | 5.8 | 5.9 | 5.8 | 5.8 |
| MFR | g/10 min | 7.8 | 7.8 | 7.7 | 7.7 | 5.6 | 5.6 | 5.5 | 5.4 |
| Melting Point | ° C. | 137.5 | 137.1 | 137.5 | 137.4 | 121.1 | 121.1 | 121.0 | 120.9 |
| Activity | g/g-Cat | 39000 | 31000 | 40600 | 19300 | 37200 | 49000 | 44000 | 23500 |
| Formation of the Polymer lump/String | wt % | 0.09 | 0.06 | 2.5 | 0.005 | 0.10 | 3.2 | 2.6 | 0.21 |

The propylene-ethylene-1-butene random copolymer obtained in the vessel for the main polymerization was taken out successively from the polymerization vessel through a pipe 4 so that the reaction level of the copolymer occupied about 50 vol.% of the reaction volume. After 50 hours from the beginning of the polymerization reaction, the polymer in the polymerization vessel was recovered and combined with that taken out from the vessel through the pipe 4 to use as a sample for classification of mass. A part of the polymer taken out from the pipe 4 was used as a sample for measurement of a melt flow index (MFR) and infrared absorption spectrum for determining the content of ethylene and 1-butene. Additionally, it was used as a sample for determining the yield of the polymer per unit weight of the catalyst by inductively coupled plasma emission spectroscopy (ICP method) of the C1component in the polymer. The results are shown in Table 1.

Methods of measurement of various physical properties
(1) Melt flow index (MFR) : Measured at 230° C. under load of 21.18 N according to the JIS K7210 (unit: g/10 min).
(2) Melting point: Using a differential scanning calorimeter (DSC7 type, Perkin-Elmer Co.), the copolymer was warmed up from room temperature to 230 ° C. at a programming rate of 30° C./minute, then kept at the same temperature for 10 minutes, then cooled to −20° C. at a rate of −20° C./minute, and kept at the same temperature for 10 minutes. Then the peak temperature during melting at a programming rate of 20° C./minute was measured. This was regarded as melting point (unit, ° C.). (3) The yield of lump and string-like irregular shape polymer was classified using a JIS standard sieve of 4750 μm mesh. The weight of polymer remaining on the sieve was measured, and the rate to the total polymer weight was calculated (unit: wt %).

The abbreviated words in Table are as follows. TEA: triethylaluminum [organoaluminum compound (B') or (B)] DiPDMS: diisopropyldimethoxysilane [organosilicon compound (C'), (C") or (C)] H$_2$/C$_3$" mole ratio: molar ratio of gas-phase hydrogen/propylene C$_2$"/C$_3$" mole ratio: molar ratio of gas-phase ethylene/propylene C$_4$"/C$_3$" mole ratio: molar ratio of gas-phase 1-butene/propylene MFR: Melt flow index of the composition

Example 2

To the pre-activated catalyst (b-1) from the titanium-containing solid catalyst component (A), which was obtained in accordance with Example 1a), was added 104.6 g of the organosilicon compound (C"), and the resulting catalyst was used in the main polymerization. Gas-phase polymerization of propylene, ethylene and 1-butene was carried out in accordance with Example 1, wherein the titanium-containing solid catalyst component (A) was used in an amount of 0.43 g/hr and the gas molar ratio was adjusted to the values as described in Table 1.

Comparative Example 1

The pre-activated catalyst (b-1) from the titanium-containing solid catalyst component (A), which was obtained in accordance with Example 1a), was used in the main polymerization without adding the organosilicon compound (C"). Gas-phase polymerization of propylene, ethylene and 1-butene was carried out in accordance with Example 1, wherein the titanium-containing solid catalyst component (A) was used in an amount of 0.33 g/hr and the gas molar ratio was adjusted to the values as described in Table 1.

Comparative Example 2

To the pre-activated catalyst (b-1) from the titanium-containing solid catalyst component (A), which was obtained in accordance with Example 1a), was added 380.4 g of the organosilicon compound (C"), and the resulting catalyst was used in the main polymerization. Gas-phase polymerization of propylene, ethylene and 1-butene was carried out in accordance with Example 1, wherein the titanium-containing solid catalyst component (A) was used in an amount of 0.68 g/hr and the gas molar ratio was adjusted to the values as described in Table 1.

Example 3 a) Preparation of the Catalyst for the Main Polymerization

In accordance with Example 1, a pre-activated catalyst (b-2) was prepared, wherein 100 g of the solid product obtained by repeating the preparation of the titanium-containing solid catalyst component (A) as described in Example 1, 11.9 g of triethylaluminum (organoaluminum compound (B')), 2.8 g of diisopropyldimethoxysilane (organosilicon compound (C')) and 200 g of propylene were used. A catalyst for the main polymerization was prepared in accordance with Example 1, wherein 174.3 g of diisopropyldimethoxysilane (organosilicon compound (C")) was added to the above-prepared pre-activated catalyst.

b) Polymerization Step

Gas-phase polymerization of propylene, ethylene and 1-butene was carried out in accordance with Example 1. In this reaction, however, the catalyst for the main polymerization was used in an amount of 0.36 g/hr as the titanium-containing solid catalyst component (A), and the gas molar ratio was adjusted to the values as described in Table 1.

Comparative Example 3

The pre-activated catalyst (b-2) which was obtained in accordance with Example 3 was used as a catalyst for the main polymerization without adding the organosilicon compound (C"). Gas-phase polymerization of propylene, ethylene and 1-butene was carried out in accordance with Example 3. In this reaction, however, the catalyst for the main polymerization was used in an amount of 0.27 g/hr as the titanium-containing solid catalyst component (A), and the gas molar ratio was adjusted to the values as described in Table 1.

Comparative Example 4

The pre-activated catalyst (b-2) which was obtained in accordance with Example 3 was used as a catalyst for the main polymerization without adding the organosilicon compound (C"). The catalyst for the main polymerization was continuously sprayed, while the amount of the titanium-containing solid catalyst component (A) was kept at 0.30 g/hr, the molar ratio of TEA (triethylaluminum) (organoaluminum compound (B)) and diisopropyldimethoxysilane (organosilicon compound (C)) was adjusted to 1.2 as Al/Si during the polymerization, and the gas molar ratio was adjusted to the values as described in Table 1. Otherwise, gas-phase polymerization of propylene, ethylene and 1-butene was carried out in accordance with Example 3.

Comparative Example 5

The pre-activated catalyst (b-2) which was obtained in accordance with Example 3 was used as a catalyst for the main polymerization without adding the organosilicon compound (C") The catalyst for the main polymerization was continuously sprayed, while the amount of the titanium-containing solid catalyst component (A) was kept at 0.57 g/hr, the molar ratio of TEA (triethylaluminum) (organoaluminum compound (B)) and diisopropyldimethoxysilane (organosilicon compound (C)) was adjusted to 0.5 as Al/Si during the polymerization, and the gas molar ratio was adjusted to the values as described in Table 1. Otherwise, gas-phase polymerization of propylene, ethylene and 1-butene was carried out in accordance with Example 3.

Example 4 a) Preparation of the Catalyst for the Main Polymerization

In accordance with Example 1, a pre-activated catalyst (b-3) was prepared, wherein 130 g of the titanium-containing solid catalyst component prepared in accordance with Example 1, 15.5 g of triethylaluminum (organoaluminum compound (B')), 3.6 g of diisopropyldimethoxysilane (organosilicon compound (C')) and 260 g of propylene were used. A catalyst for the main polymerization was prepared in accordance with Example 1, except that 278.9 g of diisopropyldimethoxysilane (organosilicon compound (C")) was added to the pre-activated catalyst (b-3).

b) Polymerization Step

Gas-phase polymerization of propylene, ethylene and 1-butene was carried out in accordance with Example 1. In this reaction, however, the catalyst for the main polymerization was used at a rate of 0.30 g/hr as the titanium-containing solid catalyst component (A), the gas molar ratio was adjusted to the values as described in Table 2, and the polymerization pressure was fixed at 1.8 MPaG.

Example 5 a) Preparation of a Pre-activated Catalyst (b-4)

Air in a 20 liter stainless steel reaction vessel equipped with stirring sloped blades was replaced with nitrogen gas. n-Hexane (6 liter) was placed therein, to which was added 400 g of the solid product obtained by repeating the preparation of the titanium-containing solid catalyst component (A) as in Example 1, 47.7 g of triethylaluminum (organoaluminum compound (B')) and 11.0 g of diisopropyldimethoxysilane (organosilicon compound (C')) Then, 800 g of propylene was supplied thereto over 3 hours. After the reaction completion, propylene remaining unchanged was eliminated and the pre-activated catalyst was obtained, in which product 1 g of the titanium-containing solid catalyst component had reacted with 1.9 g of propylene.

b) Addition of an Organosilicon Compound (C")

To the above-mentioned pre-activated catalyst was added 11.6 g of organosilicon compound (C"), and the mixture was stirred for 30 minutes to give a catalyst for the main polymerization.

c) Polymerization Step

Random copolymerization of propylene and ethylene was carried out in accordance with Example 1, wherein the catalyst for the main polymerization was continuously sprayed, while the amount of the titanium-containing solid catalyst component (A) was kept at 0.42 g/hr, the molar ratio of TEA (triethylaluminum) (organoaluminum compound (B)) and diisopropyldimethoxysilane (organosilicon compound (C)) was adjusted to 6 as Al/Si during the polymerization, the gas molar ratio was adjusted to the values as described in Table 2, and the polymerization pressure was fixed at 2.2 MPaG. The result is shown in Table 2.

Example 6 a) Preparation of a Catalyst for the Main Polymerization

A catalyst for the main polymerization was prepared in accordance with Example 5, wherein 5.3 g of the organosilicon compound (C") was added to the pre-activated catalyst (b-4) prepared in accordance with Example 5.

b) Polymerization Step

Homopolymerization of propylene was carried out in accordance with Example 5, wherein the catalyst for the main polymerization was used at a rate of 0.48 g/hr, and the gas molar ratio was adjusted to the values as described in Table 2.

Comparative Example 6

The pre-activated catalyst (b-4) which was obtained in accordance with Example 5 was used as a catalyst for the main polymerization without adding the organosilicon compound (C"). Homopolymerization of propylene was carried out in accordance with Example 6, wherein the catalyst for the main polymerization was used at a rate of 0.46 g/hr, and the gas molar ratio was adjusted to the values as described in Table 2.

Example 7 a) Preparation of a Catalyst for the Main Polymerization

A catalyst for the main polymerization was prepared in accordance with Example 1, wherein 174.5 g of the organosilicon compound (C") was added to the catalyst (b-1) prepared by pre-activation of the titanium-containing solid catalyst component (A) obtained in accordance with Example 1a).

b) Polymerization Step

Random copolymerization of propylene and ethylene was carried out in accordance with Example 5, wherein the catalyst for the main polymerization was continuously sprayed, while the amount of the titanium-containing solid catalyst component (A) was kept at 0.27 g/hr, the molar ratio of TEA (triethylaluminum)(organoaluminum compound (B)) and diisopropyldimethoxysilane (organosilicon compound (C)) was adjusted to 3 as Al/Si during the polymerization, and the gas molar ratio was adjusted to the values as described in Table 2. In this situation, the rate of the polymer production was 15 kg/hr to 17 kg/hr.

Comparative Example 7

The pre-activated catalyst (b-1) which was obtained in accordance with Example 1a) was used as a catalyst for the main polymerization without adding the organosilicon compound (C"). Random copolymerization of propylene and ethylene was carried out in accordance with Example 7, wherein the gas molar ratio was adjusted to the values as described in Table 2.

Example 8 a) Preparation of a Catalyst for the Main Polymerization

A catalyst for the main polymerization was prepared in accordance with Example 4, wherein 15.8 g of the organosilicon compound (C") was added to the pre-activated catalyst (b-3) prepared in accordance with Example 4a).

b) Polymerization Step

Random copolymerization of propylene and 1-butene was carried out in accordance with Example 5, wherein the catalyst for the main polymerization was used in a rate of 1.59 g/hr as the titanium-containing solid catalyst component (A), the polymerization pressure was fixed at 1.1 MPaG, and the gas molar ratio was adjusted to the values as described in Table 2. In this situation, the rate of the polymer production was 9 kg/hr to 11 kg/hr.

Comparative Example 8 a) Preparation of a Catalyst for the Main Polymerization

To the pre-activated catalyst (b-1) obtained in accordance with Example 1 was added 44.7 g of an organoaluminum compound and an organosilicon compound (C") in an amount equivalent to Example 1c). The mixture was stirred for 30 minutes to yield a catalyst for the main polymerization b) Polymerization Step Gas-phase polymerization of propylene, ethylene and 1-butene was carried out in accordance with Example 1. In this reaction, however, the catalyst for the main polymerization was used in a rate of 0.36 g/hr as the titanium-containing solid catalyst component (A), and the gas molar ratio was adjusted to the values as described in Table 2.

TABLE 2

Polymerization Condition and Result of Polymerization - II

| | | Examp. 4 | Examp. 5 | Examp. 6 | C. Ex. 6 | Examp. 7 | C. Ex. 7 | Examp. 8 | C. Ex. 8 |
|---|---|---|---|---|---|---|---|---|---|
| <Pre-Activation> | | | | | | | | | |
| Organo-Al Compound (B') | | TEA | TEA | TEA | TEA | TEA | TEA | TEA | TEA |
| Organo-Si Compound (C') | | DiPDMS | DiPDMS | DiPDMS | DiPDMS | DiPDMS | DiPDMS | DiPDMS | DiPDMS |
| Pre-active Cat. Slurry Conc. | wt % | 1.094 | 10 | 10 | 10 | 0.631 | 0.631 | 1.094 | 0.631 |
| Al/Ti/Si mole ratio, pre-active | | 2/1/0.3 | 2/1/0.3 | 2/1/0.3 | 2/1/0.3 | 2/1/0.3 | 2/1/0.3 | 2/1/0.3 | 2/1/0.3 |
| <Amt. of Org. Si Compd. Added> | | | | | | | | | |
| Organo-Si Compound (C") | | DiPDMS | DiPDMS | DiPDMS | None | DiPDMS | none | DiPDMS | DiPDMS |
| (C") conc. | mmol/L-C6 | 88 | 11 | 5 | — | 55 | — | 5 | 11 |
| Si (C")/Ti mole ratio | | 23.4 | 0.32 | 0.14 | — | 25.3 | — | 1.3 | 5.1 |
| <Amt. of Org. Al Compd. Added> | | | | | | | | | |
| Organo-Al Compound | | None | None | none | None | None | none | None | TEA |
| Al/Ti mol. ratio, Org. Al Cmp. Add. | | — | — | — | — | — | — | — | 10 |
| <Main Polymerization> | | | | | | | | | |
| Organo Al Compound (B) | | TEA | TEA | TEA | TEA | TEA | TEA | TEA | TEA |
| Organo Si Compound (C) | | DiPDMS | DiPDMS | DiPDMS | DiPDMS | DiPDMS | DiPDMS | DiPDMS | DiPDMS |
| Al (B)/Mg mole ratio | | 6 | 6 | 6 | 6 | 6 | 6 | 6 | 5.5 |
| Al (B)/Si (C) mole ratio | | 1.5 | 6 | 6 | 6 | 3 | 3 | 6 | 1.5 |
| Temperature | C. | 65 | 65 | 65 | 65 | 65 | 65 | 65 | 65 |
| Pressure | MpaG | 1.8 | 2.2 | 2.2 | 2.2 | 2.2 | 2.2 | 1.1 | 2.0 |
| H2/C3" mole ratio | | 0.022 | 0.010 | 0.020 | 0.018 | 0.040 | 0.031 | 0.008 | 0.042 |
| C2"/C3" mole ratio | | 0.030 | 0.008 | — | — | 0.045 | 0.028 | — | 0.012 |
| C4"/C3" mole ratio | | 0.114 | — | — | — | — | — | 0.225 | 0.052 |
| <Result> | | | | | | | | | |
| Ethylene content In copolymer | wt % | 5.4 | 2.0 | — | — | 7.0 | 4.8 | — | 2.1 |
| Butene content in copolymer | wt % | 6.7 | — | — | — | — | — | 15.1 | 4.0 |
| MFR | g/10 min | 5.1 | 3.0 | 7.9 | 8.0 | 6.1 | 6.2 | 1.2 | 7.9 |
| Melting Point | ° C. | 114.1 | 147.4 | 164.0 | 164.2 | 118.9 | 132.4 | 117.5 | 137.3 |
| Activity | g/g-Cat | 45000 | 31600 | 27600 | 29000 | 60100 | 59700 | 6300 | 36200 |

TABLE 2-continued

Polymerization Condition and Result of Polymerization - II

|  |  | Examp. 4 | Examp. 5 | Examp. 6 | C. Ex. 6 | Examp. 7 | C. Ex. 7 | Examp. 8 | C. Ex. 8 |
|---|---|---|---|---|---|---|---|---|---|
| Formation of the Polymer Lump/String | wt % | 0.11 | 0.10 | 0.08 | 0.14 | 0.12 | 7.5 | 0.001 | 2.7 |

Evaluation of the Results

In production of random copolymers, Comparative Example 1 in which no organosilicon compound (C") is added indicates that a polymer lump and string formation increases in comparison with Examples 1 and 2 in which the organosilicon compound (C") is added within the scope claimed in the present specification;

In Comparative Example 2 in which the organosilicon compound (C") was added in an amount over the scope claimed in the present specification, polymer lump and string formation decreased, but the activity greatly decreased as well.

In producing the random copolymers in a higher range of co-monomer production (lower melting point), Comparative Example 3 in which no organosilicon compound (C") was added showed extremely high polymer lump and string formation in comparison with Example 3 in which the organosilicon compound (C") was added within the scope claimed in the present specification. This made long term operation difficult.

In producing the random copolymers, Comparative Example 4 in which an organosilicon compound was fed in a larger quantity than in usual operation during the main polymerization but not to the pre-activated catalyst, indicated that the polymer lump and string formation was not reduced in comparison with Comparative Example 3 in which no organosilicon compound (C") was added to the pre-activated catalyst.

In producing the random copolymers, Comparative Example 5 in which an organosilicon compound was fed in a much more quantity than in usual operation during the main polymerization but not to the pre-activated catalyst, indicated that the polymer lump and string formation was reduced in comparison with Comparative Example 3 in which no organosilicon compound (C") was added to the pre-activated catalyst, but the activity was also extremely reduced.

In producing polypropylene polymers, Comparative Example 6 in which no organosilicon compound (C") was added, indicated that the polymer lump and string formation increased in comparison with Example 6 in which the organosilicon compound (C") was added within the scope claimed in the present specification.

In the production of random copolymers carried out at a lower melting point than that of the polymer obtained in Example 3 and in a higher ethylene content, Comparative Example 7 in which no organosilicon compound (C") was added showed very high the polymer lump and string formation, which made long term operation difficult. In contrast to Comparative Example 7, Example 7 in which the organosilicon compound (C") was added within the scope claimed in the present specification indicated that the polymer lump and string formation was reduced remarkably even though the ethylene content was higher than that of Comparative Example 7. Operability was good.

In producing random copolymers, when the amount of an organoaluminum compound used in the catalyst for the main polymerization is over 10 moles based on 1 mole of titanium atom in the titanium-containing solid catalyst component (A), the polymer lump and string formation is high as shown in Comparative Example 8, in comparison with that of Example 1.

Industrial Applicability

As shown in the above Examples, formation of lump and string-like irregular shape polymers in producing propylene homopolymers or propylene-α-olefin random copolymers can be reduced by using a catalyst for polymerization to which is added an organosilicon compound, after pre-activation treatment of the titanium-containing solid catalyst component. Thus, deterioration of fluidity was improved, and long-term stable operation become possible.

The present invention provides a method for reducing formation of lump and string-like irregular shape polymers, etc., in producing propylene homopolymers or propylene-α-olefin random copolymers to further improve the quality of films, etc., and has great significance industrially.

What is claimed is:

1. In a process for producing propylene homopolymers or propylene-α-olefin random copolymers by polymerization of propylene or copolymerization of propylene with an α-olefin other than propylene using a stereo regular catalyst which comprises a titanium-containing solid catalyst component (A), an organoaluminum compound (B) of the general formula $AlR^1_m X_{3-m}$, wherein $R^1$ is a hydrocarbon group of 1–20 carbon atoms; X is a halogen atom; m is an integer of 3 $\geq m > 1.5$, and optionally an organosilicon compound (C) of the general formula $R^2_x R^3_y Si(OR^4)_z$, wherein $R^2$ and $R^4$ each is a hydrocarbon group; $R^3$ is a hydrocarbon group containing at least one heteroatom; $0 \leq x \leq 2$, $1 \leq y \leq 3$, $1 \leq z \leq 3$, and $x+y+z=4$, the improvement comprising conducting the polymerization of propylene or copolymerization of propylene with an α-olefin other than propylene, by the steps of:

preactivating the titanium-containing solid catalyst component (A) and the organo aluminum compound (B) and optionally the organosilicon compound (C), by treating with propylene or ethylene and/or a linear α-olefin of 4 to 20 carbon atoms to form a pre-activated stereoregular catalyst, and adding the organosilicon compound (C) to the preactivated stereoregular catalyst in a molar ratio of 0.1 to 50 as Si/Ti.

2. A process according to claim 1, wherein the polymerization process is a gas phase polymerization.

* * * * *